United States Patent [19]

Auyeung

[11] Patent Number: 5,793,314
[45] Date of Patent: *Aug. 11, 1998

[54] METHOD AND APPARATUS FOR BOUND-BASED ADAPTIVE ENTROPY ENCODING/ DECODING

[75] Inventor: Cheung Auyeung, Hoffman Estates, Ill.

[73] Assignee: Motorola, Inc., Schaumburg, Ill.

[*] Notice: The term of this patent shall not extend beyond the expiration date of Pat. No. 5,473,376.

[21] Appl. No.: 676,603

[22] Filed: Jul. 3, 1996

[51] Int. Cl.⁶ .............................. H04N 7/26; H04N 7/30
[52] U.S. Cl. .............................................. 341/51; 348/403
[58] Field of Search .......................... 341/50, 51, 59; 348/419, 420, 403, 405

[56] References Cited

U.S. PATENT DOCUMENTS 5,473,376  12/1995  Auyeung ................................. 348/403

Primary Examiner—Jeffrey A. Gaffin
Assistant Examiner—Peguy JeanPierre
Attorney, Agent, or Firm—Darleen J. Stockley

[57] ABSTRACT

The present invention provides an apparatus and method for adaptive entropy encoding/decoding in a multimedia compression system. For encoding, the steps include: A) parsing a predetermined number of quantized transform coefficients into a plurality of coefficient groups in a predetermined scanning order and converting the coefficient groups into a plurality of parameter sets according to a predetermined scheme and storing the parameter sets wherein, where a last coefficient group comprises all zero quantized transform coefficients, the last coefficient group is discarded; B) sending, in accordance with a signal from the encoder controller, a current parameter set of the plurality of parameter sets in the predetermined scanning order; C) adaptively selecting a current entropy encoder based on a state parameter of a last parameter set; D) encoding a current parameter set to provide entropy-encoded information bits. Decoding is accomplished in a fashion that mirrors the encoding method.

6 Claims, 4 Drawing Sheets

METHOD AND APPARATUS FOR BOUND-BASED ADAPTIVE ENTROPY ENCODING/DECODING

FIELD OF THE INVENTION

The present invention relates to video/image compression and, more particularly, to coding of transform coefficients.

BACKGROUND OF THE INVENTION

Video systems are known to include a plurality of communication devices and communication channels, which provide the communication medium for the communication devices. For example, the communication channel may be wire line connections or radio frequency, RF, carriers. To increase the efficiency of the video system, video that needs to be communicated over the communication medium is digitally compressed. Digital compression reduces the number of bits needed to represent the video while maintaining perceptual quality of the video. The reduction in bits allows more efficient use of channel bandwidth and reduces storage requirements. To achieve digital video compression, each communication device may include an encoder and a decoder. The encoder allows a communication device to compress video before transmission over a communication channel. The decoder enables the communication device to receive compressed video from a communication channel and render it visible. Communication devices that may use digital video compression include television transmitters and receivers, cable television transmitters and receivers, video telephones, computers and portable radios.

Several emerging standards for digital video compression are being developed, including International Telecommunications Union (ITU), ITU-T Recommendation H.263+ and H.263/L, the International Standards Organization/International Electrotechnical Committee (ISO/IEC), and International Standard MPEG-4. These standards are likely to use transform coding as part of the building blocks for good coding efficiency. Currently, the Expert's Group on Very Low Bitrate Visual Telephony, LBC, is considering using the discrete cosine transform for coding efficiency. The Moving Pictures Expert's Group, MPEG, is also likely to use the discrete cosine transform or other type of transform. To achieve compression, the transform coefficients are quantized, scanned, and entropy coded. Therefore, to maximize the compression capability, a need exists for a method and apparatus for encoding/decoding the scanned quantized transform coefficients so that they can be more efficiently compressed than the emerged standard H.261, H.263, MPEG-1, and MPEG-2.

DETAILED DESCRIPTION OF A PREFERRED EMBODIMENT

Figure 1:
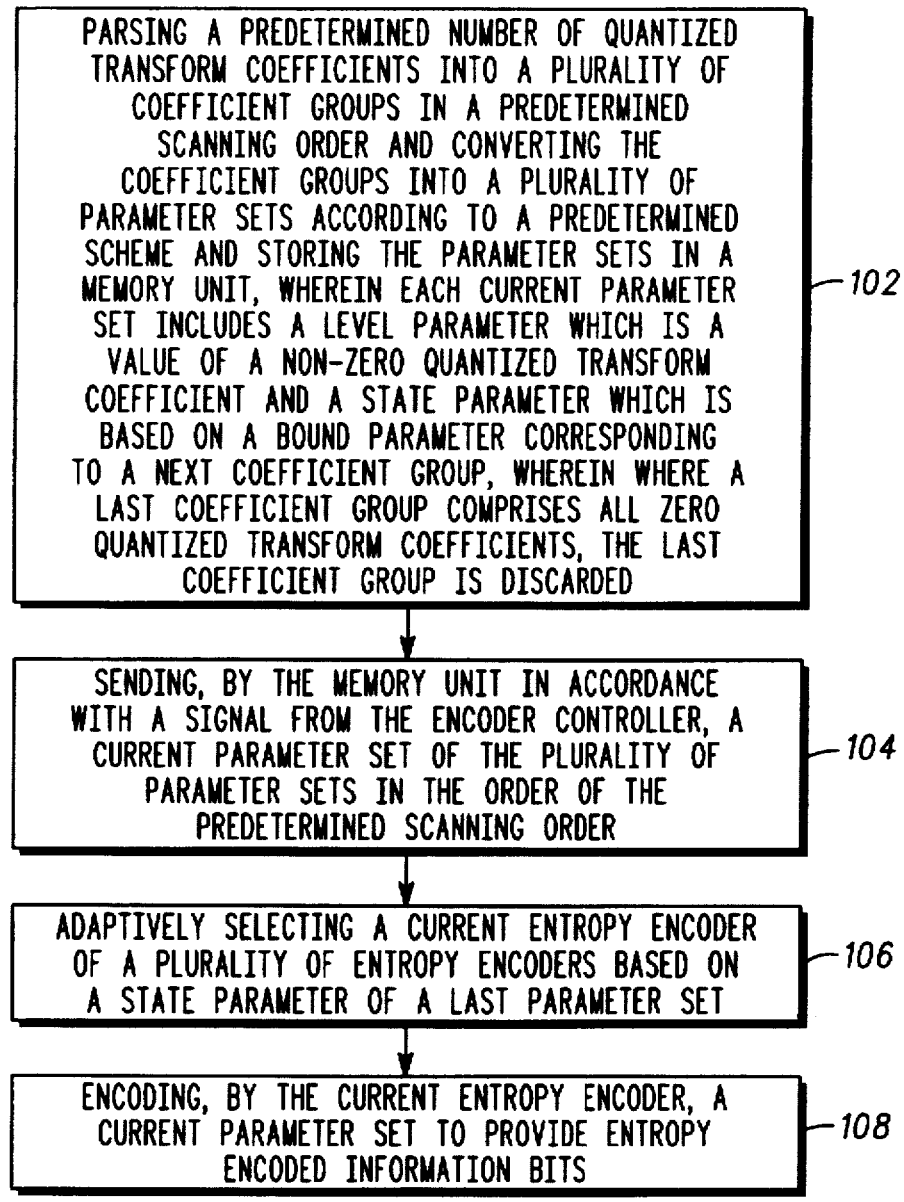
FIG. 1 is a flow chart of one embodiment of steps of a method for encoding in accordance with the present invention.

The present invention is a method and an apparatus for entropy encoding/decoding scanned transform coefficients in a video/image compression system. For entropy encoding, The present invention is a method and an apparatus for adaptive entropy encoding/decoding of a plurality of quantized transform coefficients. For encoding, first, a predetermined number of quantized transform coefficients are received in a predetermined order giving a generally decreasing average power. Second, the coefficients are then parsed in the reverse order of the predetermined order to obtain the non-increasing least upper bound of the coefficients. Third, the quantized transform coefficients are parsed into a plurality of coefficient groups. When a last coefficient group comprises all zero quantized coefficients, the last coefficient group is discarded. A current coefficient group and the bound of the next coefficient group are then converted into a current parameter set containing a current state parameter. Then a current entropy encoder is adaptively selected based on the previous state parameter of a previous parameter set to encode the current parameter set to provide entropy encoded information bits.

This invention may be used with a compression algorithm that processes a picture into two-dimensional blocks of quantized transform coefficients with predetermined transform sizes. Each block is then scanned into at least one one-dimensional array in a predetermined order giving generally decreasing average power.

Each one-dimensional array of quantized transform coefficients are parsed into a sequence of coefficient groups as shown by the following example. For example, consider an array having 28 coefficients, only seven of which are non-zero:

$$\{8, 6, 0, 4, 0, 0, 1, 2, 1, 0, 1, 0, 0, \ldots\} \qquad (1)$$

After parsing, the coefficient groups are $$\{8\}, \{6\}, \{0, 4\}, \{0, 0, 1\}, \{2\}, \{1\}, \{0, 1\} \qquad (2)$$

In general, the number of coefficient groups is the same as the number of non-zero coefficients since the last group, $\{0, 0, \ldots\}$, which consists of all zero coefficients, is discarded. Each coefficient group has the form $$\{0, \ldots, 0, 1\} \qquad (3)$$

which consists of a sequence of zero coefficients followed by a non-zero coefficient, l. The coefficient groups are also ordered in the same manner as the coefficients.

The coefficient groups are then parsed in the reverse order of the predetermined order to obtain the monotonic least upper bound. For example, the montonic least upper bound of the coefficient groups in (2) is $$8,6,4,2,2,1,1 \qquad (4)$$

In general, the montonic least upper bound is generated as follows. Let $G_1, G_2, \ldots, G_n$ be the coefficient groups after parsing, where $$G_k = \{0, \ldots, 0, l_k\} \qquad (5)$$

The monotonic least upper bound bk of the group is the maximum absolute value of $$l_k, l_{k+1}, \ldots, l_n \qquad (6)$$

To reduce computation, $b_k$ can also be determined recursively as the maximum absolute value of $l_k$ and $b_{k+1}$ starting from k=n.

Each coefficient group $\{0, \ldots, 0, l_k\}$ and its bound $b_k$ are converted into a parameter set $$\{r_k, I_k, S_k\}$$

where $r_k$ is the run, which may be equal to zero, defined as the number of zero coefficients in the coefficient group, $l_k$ is the level, and $S_k$ is the state. The state is a monotonic function of $b_{k+1}$. For example, for $1 \leq k < n$, the state is defined as $S_k = 3$, if $4 \leq b_{k+1}$;

$S_k = 2$, if $2 \leq b_{k+1} < 4$;

$S_k = 1$, if $b_{k+1} < 2$;

For $k=n$, the state is defined as $S_k = 0$, which indicates that it is the last parameter set. In particular, the coefficient groups in (2), becomes the parameter set
$\{0, 8, 3\}, \{0, 6, 3\}, \{0, 4, 2\}, \{2, 1, 2\}, \{0, 2, 1\}, \{0, 1, 1\}, \{1, 1, 0\}$.

The present invention can be more fully described with reference to FIGS. 1–6. FIG. 1, numeral 100, is a flow chart of one embodiment of steps of a method for encoding in accordance with the present invention. The first step in the encoding method is parsing a predetermined number of quantized transform coefficients into a plurality of coefficient groups in a scanning order of generally decreasing power and converting the coefficient groups into a plurality of parameter sets according to a predetermined scheme and storing the parameter sets in a memory unit, wherein each current parameter set includes a level parameter which is a value of a non-zero quantized transform coefficient and a state parameter which is based on a bound parameter corresponding to a next coefficient group, wherein, where a last coefficient group comprises all zero quantized transform coefficients, the last coefficient group is discarded (102). The second step in the encoding method is sending, by the memory unit in accordance with a signal from the encoder controller, a current parameter set of the plurality of parameter sets in the predetermined scanning order (104). The third step in the encoding method is selecting a current entropy encoder of a plurality of entropy encoders based on a state parameter of a last parameter set (106). The fourth and final step in the encoding method is encoding, by the current entropy encoder, a current parameter set to provide entropy-encoded information bits (108).

Figure 2:
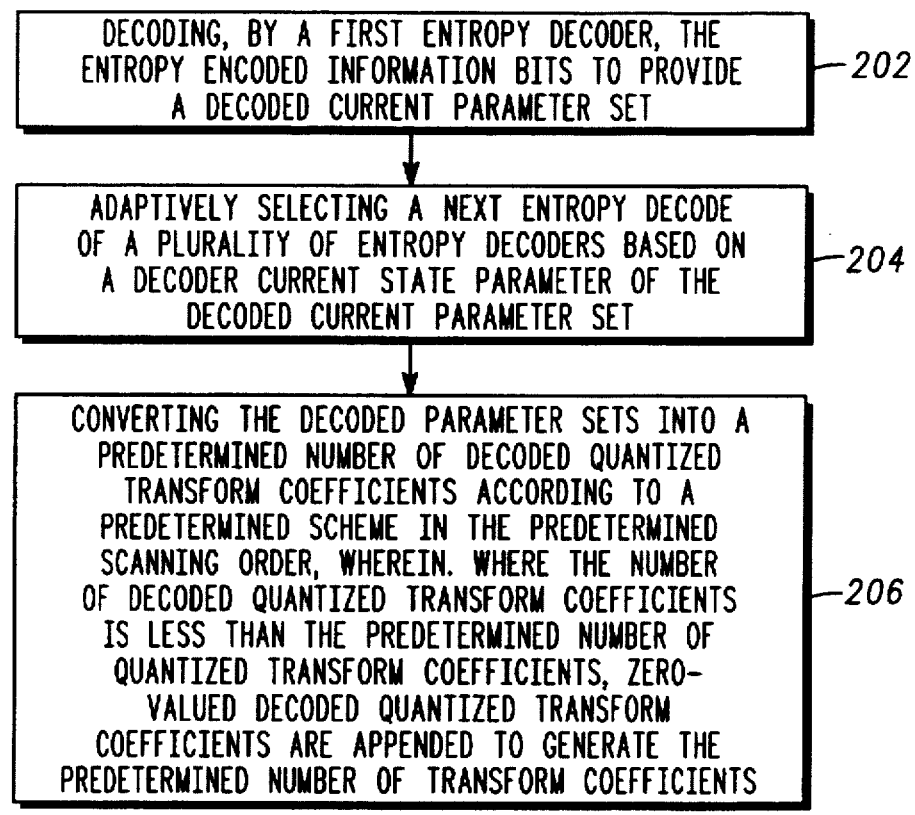
FIG. 2 is a flow chart of one embodiment of steps of a method for encoding in accordance with the present invention.

FIG. 2, numeral 200, is a flow chart of one embodiment of steps of a method for decoding in accordance with the present invention. The first step in the decoding method is decoding, by a first entropy decoder, the entropy-encoded information bits to provide a decoded current parameter set (202). The second step in the decoding process is adaptively selecting a next entropy decoder of a plurality of entropy decoders based on a decoded current state parameter of the decoded current parameter set (204). The third step in the decoding process is converting the decoded parameter sets into a predetermined number of decoded quantized transform coefficients according to a predetermined scheme in the predetermined scanning order, wherein, where the number of decoded quantized transform coefficients is less than the predetermined number of transform coefficients, zero-valued decoded quantized transform coefficients are appended to generate the predetermined number of transform coefficients (206).

Figure 3:
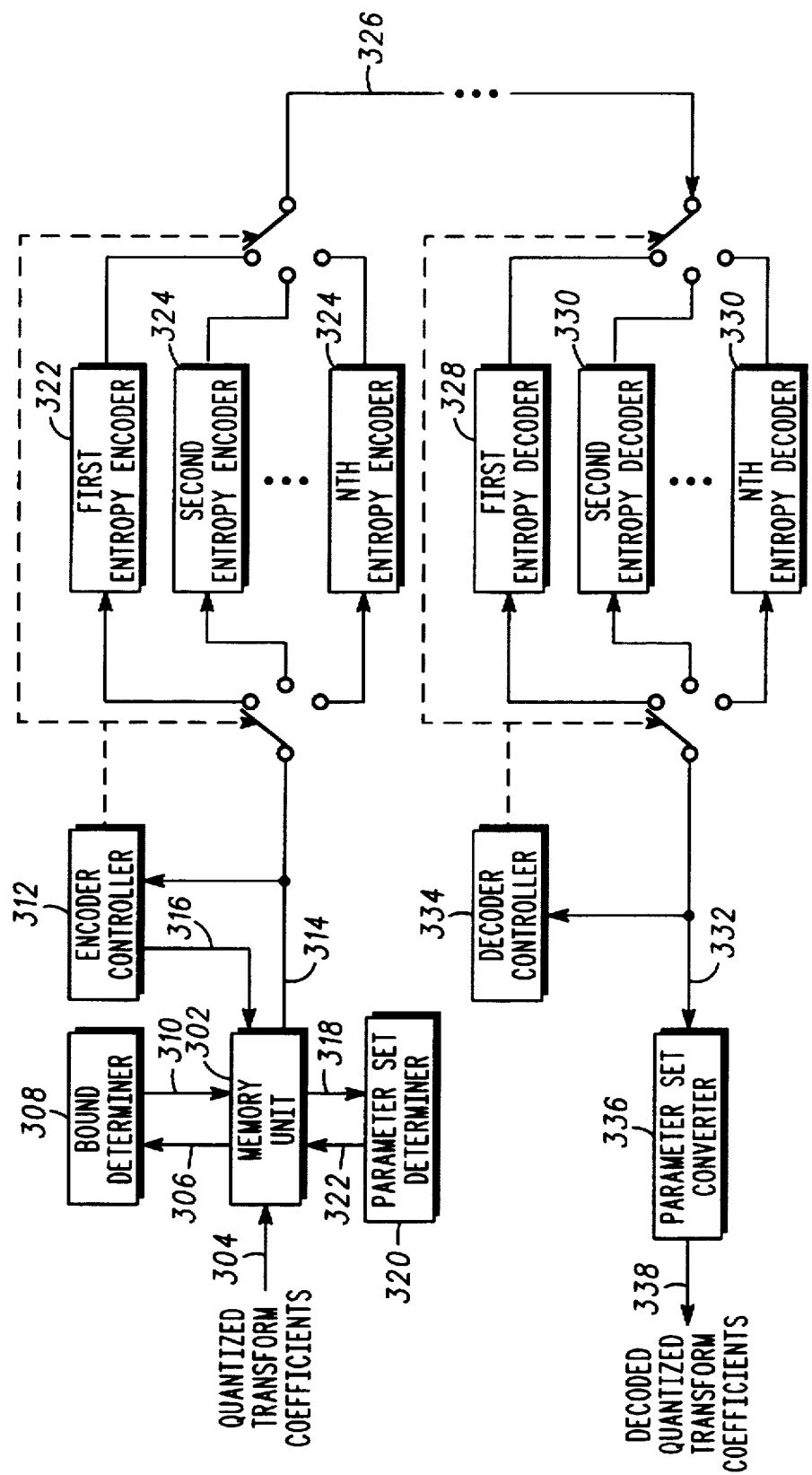
FIG. 3 is a block diagram of one embodiment of a apparatus in accordance with the present invention.

FIG. 3, numeral 300, is a block diagram of one embodiment of a encoder/decoder apparatus in accordance with the present invention. The encoder apparatus comprises a memory unit (302), a bound determiner (308), a memory unit (302), a bound determiner (304), a encoder controller (312), a plurality of entropy encoders (322)(324). When decoding is performed, the apparatus further comprises a plurality of entropy decoders (328) (330), a decoder controller (334) and a parameter set converter (336).

For encoding, the memory unit (302), coupled to a bound parameter determiner (308), a parameter set determiner (320) and an encoder controller (312) receives at least one non-zero quantized transform coefficient (304), and stores the quantized transform coefficients, bound parameters (310) and parameter sets (322). The bound parameter determiner (308), coupled to the memory unit (302), generates the bound parameters (310). The bound-based parameter set determiner (320), coupled to the memory unit (302), parses a predetermined number of quantized transform coefficients (304) into a plurality of coefficient groups in a predetermined scanning order and converting the coefficient groups into a plurality of parameter sets (322) according to a predetermined scheme and storing the parameter sets in the memory unit( 302), wherein each current parameter set includes a level parameter which is a value of a non-zero quantized transform coefficient and a state parameter which is based on a bound parameter corresponding to a next coefficient group, wherein, where a last coefficient group comprises all zero quantized transform coefficients, the last coefficient group is discarded. The encoder controller (312), coupled to the memory unit (302), for selecting a entropy encoder of a plurality of entropy encoders (322, 324) and adaptively selecting entropy encoder/encoders in accordance with the state of the last parameter set. The first entropy encoder (322), coupled to the encoder controller (312) and the memory unit (302), for encoding a first parameter set to provide entropy encoded information bits. A plurality of additional entropy encoders (324), coupled to the encoder controller (32) and the memory unit (302), for adaptively providing entropy encoded information bits in accordance with a bound-based state parameter.

For decoding, the first entropy decoder (328), coupled to the decoder controller (334) and to receive entropy encoded information bits (326), for decoding the entropy-encoded information bits to provide a first decoded parameter set. The plurality of additional entropy decoders (330), coupled to the decoder controller, receives the entropy encoded information bits, and decodes the entropy-encoded information bits to provide a current decoded parameter set. The decoder controller (334), selectively coupled to all of the entropy decoders (328,330), for adaptively selecting a next entropy decoder of a plurality of entropy decoders based on a decoded current state parameter of the decoded current parameter set (332). The bound-based parameter set converter( 336), coupled to the decoder controller (334), converts the decoded parameter sets into a predetermined number of decoded quantized transform coefficients according to a predetermined scheme in the predetermined scanning order, wherein, where the number of decoded quantized transform coefficients is less than the predetermined number of transform coefficients, zero-valued decoded quantized transform coefficients are appended to generate the predetermined number of transform coefficients.

Figure 4:
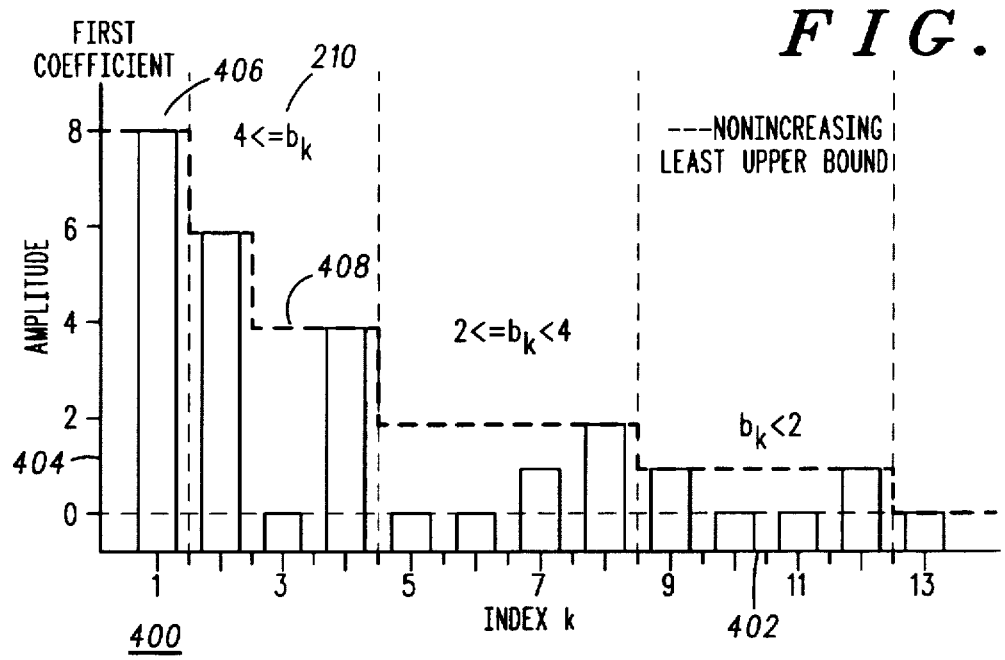
FIG. 4 is a graphical representation of a non-increasing least upper bound of scanned coefficients in accordance with the present invention.

FIG. 4, numeral 400, is a graphical representation of a non-increasing least upper bound b_k (408) of the amplitude (404) of the scanned coefficients as a function of its index k (402) in accordance with the present invention. The bounds are also classified into ranges (420) corresponding to the state parameter of the previous parameter set.

Figure 5:
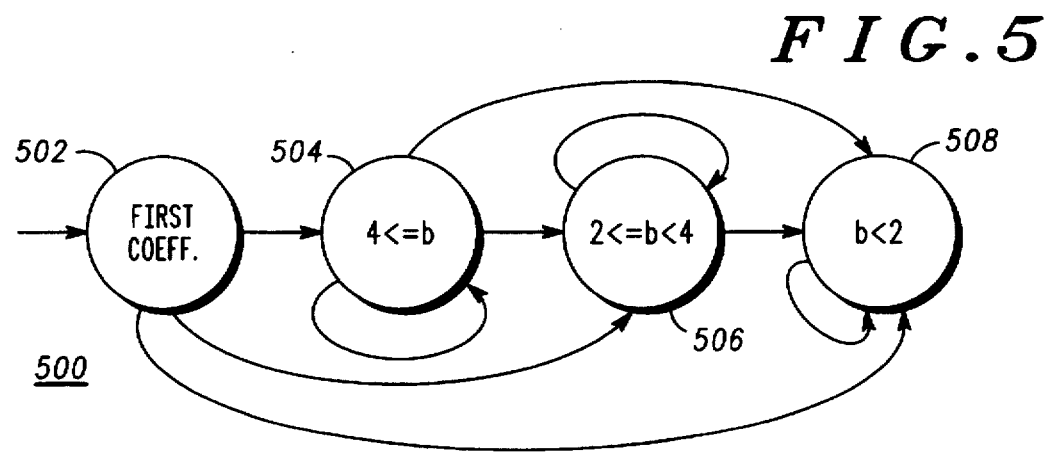
FIG. 5 is a state transition diagram of the scanned coefficients in accordance with the present invention.

FIG. 5, numeral 500, is an exemplary state transition diagram of the scanned coefficients corresponding to the state parameter of the previous parameter set in accordance with the present invention. The state transition diagram has four states corresponding to the first coefficient (502) and various ranges (504, 506, 508) of the bound of the coefficients.

Figure 6:
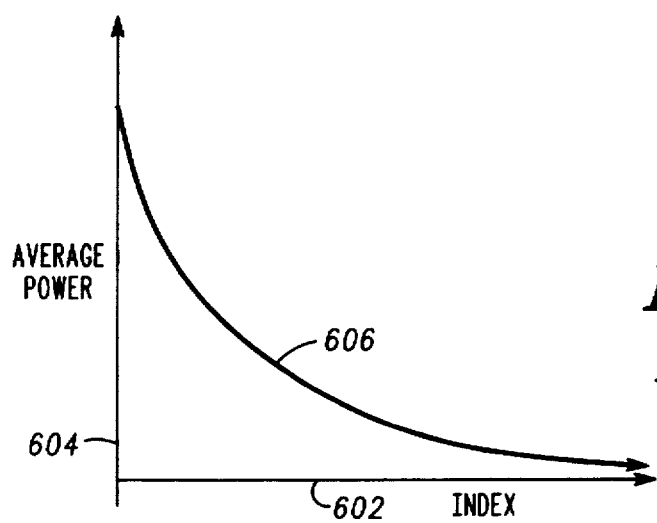
FIG. 6 is a graphical representation of the average power of the scanned coefficients in accordance with the present invention.

FIG. 6, numeral 600, is a graphical representation of the average power (640) as a generally decreasing function of the index (602) of the scanned coefficients in accordance with the present invention.

The present invention codes the quantized transform coefficients with less number of bits than the coding method used in H.261, H.263, MPEG-1, and MPEG-2. The present invention adapts to each block of quantized transform coefficients while the coding method in H.261, H.263, MPEG-1, and MPEG-2 does not.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. A method for adaptive entropy encoding/decoding in a multimedia compression system, comprising the steps of:

for encoding:
  A) parsing a predetermined number of quantized transform coefficients into a plurality of coefficient groups in a predetermined scanning order and converting the coefficient groups into a plurality of parameter sets according to a predetermined scheme and storing the parameter sets in a memory unit, wherein each current parameter set includes a level parameter which is a value of a non-zero quantized transform coefficient and a state parameter which is based on a bound parameter corresponding to a next coefficient group, wherein, where a last coefficient group comprises all zero quantized transform coefficients, the last coefficient group is discarded;
  B) sending, by the memory unit in accordance with a signal from the encoder controller, a current parameter set of the plurality of parameter sets in the predetermined scanning order;
  C) adaptively selecting a current entropy encoder of a plurality of entropy encoders based on a state parameter of a last parameter set;
  D) encoding, by the current entropy encoder, a current parameter set to provide entropy-encoded information bits; and for decoding:
  E) decoding, by a first entropy decoder, the entropy-encoded information bits to provide a decoded current parameter set;
  F) adaptively selecting a next entropy decoder of a plurality of entropy decoders based on a decoded current state parameter of the decoded current parameter set;
  G) converting the decoded parameter sets into a predetermined number of decoded quantized transform coefficients according to a predetermined scheme in the predetermined scanning order, wherein, where the number of decoded quantized transform coefficients is less than the predetermined number of transform coefficients, zero-valued decoded quantized transform coefficients are appended to generate the predetermined number of transform coefficients.

2. Digital storage media having a method stored in said digital storage media for adaptive entropy encoding/decoding in a multimedia compression system, comprising the steps of:

for encoding:
  A) parsing a predetermined number of quantized transform coefficients into a plurality of coefficient groups in a predetermined scanning order and converting the coefficient groups into a plurality of parameter sets according to a predetermined scheme and storing the parameter sets in a memory unit, wherein each current parameter set includes a level parameter which is a value of a non-zero quantized transform coefficient and a state parameter which is based on a bound parameter corresponding to a next coefficient group, wherein, where a last coefficient group comprises all zero quantized transform coefficients, the last coefficient group is discarded;
  B) sending, by the memory unit in accordance with a signal from the encoder controller, the parameter sets of the plurality of parameter sets in the predetermined scanning order;
  C) adaptively selecting a current entropy encoder of a plurality of entropy encoders based on a state of a last parameter set;
  D) encoding, by the current entropy encoder, a current parameter set to provide entropy-encoded information bits; and for decoding:
  E) decoding, by a first entropy decoder, the entropy encoded information bits to provide a decoded current parameter set;
  F) adaptively selecting a next entropy decoder of a plurality of entropy decoders based on a decoded current state parameter of the decoded current parameter set;
  G) converting the decoded parameter sets into a predetermined number of decoded quantized transform coefficients according to a predetermined scheme in the predetermined scanning order, wherein, where the number of decoded quantized transform coefficients is less than the predetermined number of transform coefficients, zero-valued decoded quantized transform coefficients are appended to generate the predetermined number of transform coefficients.

3. An apparatus for adaptive entropy encoding/decoding in a multimedia compression system, comprising:

for an encoder:
  A) a memory unit, coupled to a bound parameter determiner, a parameter set determiner and an encoder controller and to receive at least one non-zero quantized transform coefficient, for storing quantized transform coefficients, bound parameters and parameter sets;
  B) the bound parameter determiner, coupled to the memory unit, for generating the bound parameters;
  C) the bound-based parameter set determiner, coupled to the memory unit, for parsing a predetermined number of quantized transform coefficients into a plurality of coefficient groups in a predetermined scanning order and converting the coefficient groups into a plurality of parameter sets according to a predetermined scheme and storing the parameter sets in the first memory unit, wherein each current parameter set includes a level parameter which is a value of a non-zero quantized transform coefficient and a state parameter which is based on a bound parameter corresponding to a next coefficient group, wherein, where a last coefficient group comprises all zero quantized transform coefficients, the last coefficient group is discarded;

D) the encoder controller, coupled to the memory unit, for selecting a predetermined entropy encoder of a plurality of entropy encoders and adaptively selecting entropy encoder/encoders in accordance with a predetermined scheme;

E) a first entropy encoder, coupled to the encoder controller and the memory unit, for encoding a first parameter set to provide entropy encoded information bits;

F) a plurality of additional entropy encoders, coupled to the encoder controller and the memory unit, for adaptively providing entropy encoded information bits in accordance with a bound-based state parameter;

for decoding:

E) a first entropy decoder, coupled to the decoder controller and to receive entropy encoded information bits, for decoding the entropy-encoded information bits to provide a first decoded parameter set;

F) a plurality of additional entropy decoders, coupled to the decoder controller and to receive entropy encoded information bits, for decoding the entropy-encoded information bits to provide a current decoded parameter set;

G) the decoder controller, selectively coupled to all of the entropy decoders, for adaptively selecting a next entropy decoder of a plurality of entropy decoders based on a decoded current state parameter of the decoded current parameter set;

H) a bound-based parameter set converter, coupled to the decoder controller, for converting the decoded parameter sets into a predetermined number of decoded quantized transform coefficients according to a predetermined scheme in the predetermined scanning order, wherein, where the number of decoded quantized transform coefficients is less than the predetermined number of transform coefficients, zero-valued decoded quantized transform coefficients are appended to generate the predetermined number of transform coefficients.

4. An integrated circuit having an apparatus for adaptive entropy encoding/decoding in a multimedia compression system, comprising:

for an encoder:

A) a memory unit, coupled to a bound parameter determiner, a parameter set determiner and an encoder controller and to receive at least one non-zero quantized transform coefficient, for storing quantized transform coefficients, bound parameters and parameter sets;

B) the bound parameter determiner, coupled to the memory unit, for generating the bound parameters;

C) the bound-based parameter set determiner, coupled to the memory unit, for parsing a predetermined number of quantized transform coefficients into a plurality of coefficient groups in a predetermined scanning order and converting the coefficient groups into a plurality of parameter sets according to a predetermined scheme and storing the parameter sets in the first memory unit, wherein each current parameter set includes a level parameter which is a value of a non-zero quantized transform coefficient and a state parameter which is based on a bound parameter corresponding to a next coefficient group, wherein, where a last coefficient group comprises all zero quantized transform coefficients, the last coefficient group is discarded;

D) the encoder controller, coupled to the memory unit, for selecting a predetermined entropy encoder of a plurality of entropy encoders and adaptively selecting entropy encoder/encoders in accordance with a predetermined scheme;

E) a first entropy encoder, coupled to the encoder controller and the memory unit, for encoding a first parameter set to provide entropy encoded information bits;

F) a plurality of additional entropy encoders, coupled to the encoder controller and the memory unit, for adaptively providing entropy encoded information bits in accordance with a bound-based state parameter;

for decoding:

E) a first entropy decoder, coupled to the decoder controller and to receive entropy encoded information bits, for decoding the entropy-encoded information bits to provide a first decoded parameter set;

F) a plurality of additional entropy decoders, coupled to the decoder controller and to receive entropy encoded information bits, for decoding the entropy-encoded information bits to provide a current decoded parameter set;

G) the decoder controller, selectively coupled to all of the entropy decoders, for adaptively selecting a next entropy decoder of a plurality of entropy decoders based on a decoded current state parameter of the decoded current parameter set;

H) a bound-based parameter set converter, coupled to the decoder controller, for converting the decoded parameter sets into a predetermined number of decoded quantized transform coefficients according to a predetermined scheme in the predetermined scanning order, wherein, where the number of decoded quantized transform coefficients is less than the predetermined number of transform coefficients, zero-valued decoded quantized transform coefficients are appended to generate the predetermined number of transform coefficients.

5. A computer having an apparatus for adaptive entropy encoding/decoding in a multimedia compression system, comprising:

for an encoder:

A) a memory unit, coupled to a bound parameter determiner, a parameter set determiner and an encoder controller and to receive at least one non-zero quantized transform coefficient, for storing quantized transform coefficients, bound parameters and parameter sets;

B) the bound parameter determiner, coupled to the memory unit, for generating the bound parameters;

C) the bound-based parameter set determiner, coupled to the memory unit, for parsing a predetermined number of quantized transform coefficients into a plurality of coefficient groups in a predetermined scanning order and converting the coefficient groups into a plurality of parameter sets according to a predetermined scheme and storing the parameter sets in the first memory unit, wherein each current parameter set includes a level parameter which is a value of a non-zero quantized transform coefficient and a state parameter which is based on a bound parameter corresponding to a next coefficient group, wherein, where a last coefficient group comprises all zero quantized transform coefficients, the last coefficient group is discarded;

D) the encoder controller, coupled to the memory unit, for selecting a predetermined entropy encoder of a plurality of entropy encoders and adaptively selecting entropy encoder/encoders in accordance with a predetermined scheme;

E) a first entropy encoder, coupled to the encoder controller and the memory unit, for encoding a first parameter set to provide entropy encoded information bits;

F) a plurality of additional entropy encoders, coupled to the encoder controller and the memory unit, for adaptively providing entropy encoded information bits in accordance with a bound-based state parameter;

for decoding:

E) a first entropy decoder, coupled to the decoder controller and to receive entropy encoded information bits, for decoding the entropy-encoded information bits to provide a first decoded parameter set;

F) a plurality of additional entropy decoders, coupled to the decoder controller and to receive entropy encoded information bits, for decoding the entropy-encoded information bits to provide a current decoded parameter set;

G) the decoder controller, selectively coupled to all of the entropy decoders, for adaptively selecting a next entropy decoder of a plurality of entropy decoders based on a decoded current state parameter of the decoded current parameter set;

H) a bound-based parameter set converter, coupled to the decoder controller, for converting the decoded parameter sets into a predetermined number of decoded quantized transform coefficients according to a predetermined scheme in the predetermined scanning order, wherein, where the number of decoded quantized transform coefficients is less than the predetermined number of transform coefficients, zero-valued decoded quantized transform coefficients are appended to generate the predetermined number of transform coefficients.

6. A television set having an apparatus for adaptive entropy encoding/decoding in a multimedia compression system, comprising:

for an encoder:

A) a memory unit, coupled to a bound parameter determiner, a parameter set determiner and an encoder controller and to receive at least one non-zero quantized transform coefficient, for storing quantized transform coefficients, bound parameters and parameter sets;

B) the bound parameter determiner, coupled to the memory unit, for generating the bound parameters;

C) the bound-based parameter set determiner, coupled to the memory unit, for parsing a predetermined number of quantized transform coefficients into a plurality of coefficient groups in a predetermined scanning order and converting the coefficient groups into a plurality of parameter sets according to a predetermined scheme and storing the parameter sets in the first memory unit, wherein each current parameter set includes a level parameter which is a value of a non-zero quantized transform coefficient and a state parameter which is based on a bound parameter corresponding to a next coefficient group, wherein, where a last coefficient group comprises all zero quantized transform coefficients, the last coefficient group is discarded;

D) the encoder controller, coupled to the memory unit, for selecting a predetermined entropy encoder of a plurality of entropy encoders and adaptively selecting entropy encoder/encoders in accordance with a predetermined scheme;

E) a first entropy encoder, coupled to the encoder controller and the memory unit, for encoding a first parameter set to provide entropy encoded information bits;

F) a plurality of additional entropy encoders, coupled to the encoder controller and the memory unit, for adaptively providing entropy encoded information bits in accordance with a bound-based state parameter;

for decoding:

E) a first entropy decoder, coupled to the decoder controller and to receive entropy encoded information bits, for decoding the entropy-encoded information bits to provide a first decoded parameter set;

F) a plurality of additional entropy decoders, coupled to the decoder controller and to receive entropy encoded information bits, for decoding the entropy-encoded information bits to provide a current decoded parameter set;

G) the decoder controller, selectively coupled to all of the entropy decoders, for adaptively selecting a next entropy decoder of a plurality of entropy decoders based on a decoded current state parameter of the decoded current parameter set;

H) a bound-based parameter set converter, coupled to the decoder controller, for converting the decoded parameter sets into a predetermined number of decoded quantized transform coefficients according to a predetermined scheme in the predetermined scanning order, wherein, where the number of decoded quantized transform coefficients is less than the predetermined number of transform coefficients, zero-valued decoded quantized transform coefficients are appended to generate the predetermined number of transform coefficients.

* * * * *